United States Patent [19]

Gaeng et al.

[11] Patent Number: 5,637,116
[45] Date of Patent: Jun. 10, 1997

[54] LEUCOINDIGO PREPARATATIONS IN GRANULE FORM

[75] Inventors: Manfred Gaeng, Bobenheim-Roxheim; Peter Miederer, Hassloch; Peter Schultz, Bad Durkheim, all of Germany

[73] Assignee: BASF Aktiengeschaft, Ludwigshafen, Germany

[21] Appl. No.: 592,308

[22] PCT Filed: Aug. 9, 1994

[86] PCT No.: PCT/EP94/02637

§ 371 Date: Feb. 12, 1996

§ 102(e) Date: Feb. 12, 1996

[87] PCT Pub. No.: WO95/05421

PCT Pub. Date: Feb. 23, 1995

[30] Foreign Application Priority Data

Aug. 9, 1993 [DE] Germany .......................... 43 27 221.5

[51] Int. Cl.⁶ .................. D06P 1/22; D06P 5/20
[52] U.S. Cl. .................. 8/526; 8/653; 8/618; 8/651; 8/918
[58] Field of Search .................. 8/526, 650–653, 8/918; 548/458

[56] References Cited

U.S. PATENT DOCUMENTS

| 833,654 | 10/1906 | Wimmer ..................... 548/458 |
| 2,088,213 | 7/1937 | Perkins ..................... 548/458 |
| 5,053,078 | 10/1991 | Koike et al. ................. 106/22 |

FOREIGN PATENT DOCUMENTS

| 235047 | 5/1991 | Germany . |
| 431122 | 6/1994 | Germany . |
| 24605 | 7/1909 | United Kingdom . |
| WO94/21334 | 10/1994 | WIPO . |

*Primary Examiner*—Margaret Einsmann
*Attorney, Agent, or Firm*—Oblon, Spivak, McClelland, Maier & Neustadt, P.C.

[57] ABSTRACT

Leucoindigo preparations in granule form consisting essentially of leucoindigo and alkali metal hydroxide and production of these preparations and use thereof for dyeing cellulose-containing textile material.

6 Claims, No Drawings

LEUCOINDIGO PREPARATATIONS IN GRANULE FORM

The present invention relates to novel leucoindigo preparations in granule form consisting essentially of leucoindigo and alkali metal hydroxide.

The invention further relates to the production of these leucoindigo preparations and to their use for dyeing cellulose-containing textile material.

Indigo is a well known vat dye which is used for dyeing cellulose-containing textile material, especially cotton warp yarns for blue denim articles.

For dyeing, the water-insoluble indigo first has to be converted by reduction (vatting) into the water-soluble leuco form which, after absorption by the material to be dyed, is then oxidized back to the pigment.

In the customary dyeing processes, indigo is vatted in an alkaline medium in a vessel upstream of the dyebath by addition of inorganic reducing agents such as sodium dithionite and thiourea dioxide or else organic reducing agents such as hydroxyacetone. Additional machine-dependent portions of reducing agent are consumed during dyeing, since some of the leucoindigo is oxidized by air contact in the air passages and at the dyebath surface and has to be revatted, which is why small amounts of reducing agent are also added to the dyebath.

One disadvantage with the vatting of indigo using the reducing agents mentioned is the high load on the dyehouse waste water due to sulfate (from about 3,500 to 5,000 mg/l, measured in the waste water from an indigo dyehouse) in the case of sodium dithionite or due oxygen-consuming substances (COD about 8,000 mg/l, measured in the waste water from an indigo dyehouse) in the case of hydroxyacetone. Additionally the reduction, for example with sodium dithionite, requires the addition of a large amount of alkali.

It is also known to have pulverulent solid to pasty preparations of leucoindigo containing as stabilizers polyhydroxy compounds, such as glycerol and especially compounds derived from sugars, eg. molasses, mixed with alkali or zinc dust (DE 200 914 or 235 047). If these preparations are used for dyeing, it is true that the sulfate content of the dyehouse waste water can be effectively lowered, but the result is a high load on the waste water due to dissolved organic hydroxy compounds, measured as TOC (total organic carbon), COD (chemical oxygen demand) or BOD (biological oxygen demand); for example, a 60% by weight leucoindigo preparation containing 25% by weight of molasses produces a COD of about 8,000 mg/l.

FR-A-360 447 also discloses a process for the production of solid indigo white preparations in which neutral solutions of the alkali metal salts of leucoindigo are evaporated to dryness in very thin layers. However, the products obtained in this way do not have granule form and are stabilized by mixing with unslaked lime.

Finally, the earlier German Patent Application P 43 10 122.4 describes a dyeing process wherein indigo is used in pre-reduced form, in the form of the aqueous, alkaline solution obtained in catalytic hydrogenation. This eliminates the waste water load due to organic substances, while the sulfate level is reduced to the amount of hydrosulfite required for the air contact during the dyeing process. However, it is disadvantageous that the leucoindigo solution used is oxidation-sensitive and has to be handled under strict exclusion of oxygen.

It is an object of the present invention to provide a leucoindigo preparation which does not have the disadvantages mentioned and is advantageous for dyeing.

We have found that this object is achieved by leucoindigo preparations in granule form consisting essentially of leucoindigo and alkali metal hydroxide.

We have also found a process for preparing these leucoindigo preparations, comprising the step of concentrating an aqueous alkaline solution of leucoindigo to dryness under conditions of thorough mixing and oxygen exclusion.

Finally, the invention provides for the use of the leucoindigo preparations for dyeing cellulose-containing textile material.

The leucoindigo preparations of the invention contain the essential constituents leucoindigo and alkali metal hydroxide in a molar ratio from generally 1:1 to 1:10, preferably from 1:1 to 1:2.

Leucoindigo is therefore present as mono- or di-alkali metal salt, depending on the alkali metal hydroxide content.

Examples of suitable alkali metal hydroxide include in particular potassium hydroxide, and especially sodium hydroxide.

The essential feature of the leucoindigo preparations of the invention is the granule form. The granules are generally predominantly spherical particles having an average size from generally 0.1 to 2 mm, preferably from 0.5 to 1.5 mm.

It is surprising that these particles are oxidation-stable even in the absence of stabilizers. They are easily handleable and even briefly storable in air. However, for prolonged storage it is advisable to use sealed vessels.

Of particular advantage in the production of the leucoindigo preparations of the invention is that the aqueous solution obtained in the production of leucoindigo by catalytic hydrogenation can after clarification (inter alia removal of the catalyst) be used directly for drying.

The catalytic hydrogenation itself can have taken place, as generally known, for example by reduction of an alkaline indigo paste (customarily from 10 to 35% by weight of indigo, from 2 to 10% by weight of sodium hydroxide) using Raney nickel as catalyst at a hydrogen pressure from generally 2 to 4 bar and at a temperature from generally 60° to 90° C.

The leucoindigo solution obtained generally contains from 10 to 35, preferably from 15 to 30, particularly preferably from 20 to 25, % by weight of leucoindigo.

In the production process of the invention, the leucoindigo solutions are concentrated to dryness under conditions of oxygen exclusion, advantageously following inertization with a protective gas such as nitrogen, and thorough mixing.

The product temperatures required for drying depend on whether or not reduced pressure is employed and customarily range from 50° to 80° C. or from 70° to 120° C.

During the drying process, thorough mixing of the solution and of the solid product has to be ensured.

Apparatus suitable for use in industry therefore includes for example tumble dryers, paddle dryers and force-cleaned contact dryers, in which the drying is preferably carried out under reduced pressure (from about 50 to 500 mbar). If necessary, an additional coarse comminution can be carried out inside or outside the drying apparatus.

The process of the invention can also be carried out with advantage in a spray drying installation such as a spray tower and particularly a spray fluidized bed wherein the water is evaporated while under impingement of a hot inert gas, preferably nitrogen. The dried product can here be obtained directly in the desired particle size.

It is advisable, before the dried product is discharged, to cool it down to generally 20°–40° C. in order that reoxidation in the hot state may be avoided.

The process of the invention provides a simple way of producing leucoindigo preparations continuously in granule form. Generally the dried products have an unreduced indigo content of only <8% by weight.

The leucoindigo preparations of the invention are advantageously suitable for dyeing cellulose-containing textile material. The dyeings obtained fully meet the requirements. The sulfate level of the waste water and the consumption of alkali metal hydroxide during dyeing are dramatically reduced; only the leucoindigo reoxidized by air contact during the dyeing process has to be re-reduced.

EXAMPLES

Production of leucoindigo preparations according to the invention.

Example 1

A solution of 20% by weight of leucoindigo, 5% by weight of sodium hydroxide and 75% by weight of water was gradually passed at 30 mbar into a nitrogen-inertized rotary evaporator heated to an oilbath temperature of 130° C. and concentrated to dryness at a speed of 55 rpm. This is followed by cooling down to 40° C.

After a coarse comminution the granules have an average particle diameter of 1 mm. Extraction with water in a Soxleth revealed a water-insoluble content (byproducts and unreduced indigo) of 4.4% by weight.

Example 2

A solution of 20% by weight of leucoindigo, 5% by weight of sodium hydroxide and 75% by weight of water was continuously spray-granulated in a nitrogen-inertized fluidized bed at a fluidizing gas velocity of 1.2 msec$^{-1}$. The incoming gas temperature was 130° C., while the outgoing gas temperature was 90° C. and corresponded to the product temperature in the fluidized bed. The granules formed were discharged from the fluidized bed via a screw conveyor and filled into a nitrogen-purged container for cooling down to room temperature.

The granules of the useful fraction had an average particle diameter of about 1 mm. The water-insoluble content was <5% by weight.

We claim:

1. A leucoindigo preparation in granule form consisting essentially of leucoindigo and alkali metal hydroxide, wherein said granules are predominantly spherical particles having an average size from generally 0.1 to 2 mm.

2. A leucoindigo preparation as claimed in claim 1 wherein the molar ratio of leucoindigo to alkali metal hydroxide is from 1:1 to 1:10.

3. A process for preparing the leucoindigo preparation of claim 1, which comprises concentrating an aqueous alkaline solution of leucoindigo to dryness under conditions of thorough mixing and oxygen exclusion.

4. A process as claimed in claim 3 carried out in an inert gas atmosphere, under reduced pressure, or in an inert gas atmosphere under reduced pressure.

5. A process as claimed in claim 3 carried out in a spray drying installation.

6. A method for dyeing cellulose-containing textile material which comprises dyeing said textile material with the leucoindigo preparation of claim 1.

* * * * *

UNITED STATES PATENT AND TRADEMARK OFFICE
CERTIFICATE OF CORRECTION

PATENT NO. : 5,637,116
DATED : June 10, 1997
INVENTOR(S) : Manfred GAENG, et al.

It is certified that error appears in the above-indentified patent and that said Letters Patent is hereby corrected as shown below:

On the title page, item [73], the assignee should be:

--BASF Aktiengesellschaft--

On the title page, item [30], the Foreign Application Priority Data should be:

--Aug. 13, 1993  [DE]  Germany  ........  43 27 221.5--

On the title page, item [54] and the top of column 1, the title should be:

--LEUCOINDIGO PREPARATIONS IN GRANULE FORM--

Signed and Sealed this

Nineteenth Day of August, 1997

Attest:

BRUCE LEHMAN

Attesting Officer

Commissioner of Patents and Trademarks